(12) United States Patent
Blanchard et al.

(10) Patent No.: US 8,287,834 B2
(45) Date of Patent: Oct. 16, 2012

(54) COMPOSITION FOR GENERATING NITROGENOUS GAS AND INCLUDING AZODICARBONAMIDE, AND METHOD FOR GENERATING NITROGEN GAS BY DECOMPOSITION OF SAID COMPOSITION

(75) Inventors: Hélène Blanchard, Bourg la Reine (FR); Hugues Rocton, Vert le Petit (FR)

(73) Assignee: Herakles, Le Haillan (FR)

( * ) Notice: Subject to any disclaimer, the term of this patent is extended or adjusted under 35 U.S.C. 154(b) by 73 days.

(21) Appl. No.: 12/863,150

(22) PCT Filed: Jan. 20, 2009

(86) PCT No.: PCT/FR2009/050075
§ 371 (c)(1),
(2), (4) Date: Aug. 16, 2010

(87) PCT Pub. No.: WO2009/095578
PCT Pub. Date: Aug. 6, 2009

(65) Prior Publication Data
US 2010/0329960 A1 Dec. 30, 2010

(30) Foreign Application Priority Data
Jan. 21, 2008 (FR) ...................................... 08 50351

(51) Int. Cl.
*C01B 21/00* (2006.01)
(52) U.S. Cl. ........... 423/351; 252/4; 252/6; 252/183.11; 252/183.13; 169/44; 169/47
(58) Field of Classification Search .................. 423/351; 252/4, 6, 183.11, 183.13; 169/44, 47
See application file for complete search history.

(56) References Cited

U.S. PATENT DOCUMENTS

| 3,004,959 | A | 10/1961 | Finnegan et al. |
| 3,873,477 | A | 3/1975 | Beck et al. |
| 3,912,561 | A | 10/1975 | Doin et al. |
| 4,092,190 | A | 5/1978 | Flanagan |
| 4,142,029 | A | 2/1979 | Illy |
| 4,328,320 | A | 5/1982 | Reszniak et al. |
| 4,547,235 | A | 10/1985 | Schneiter et al. |
| 4,601,344 | A | 7/1986 | Reed, Jr. et al. |
| 4,948,439 | A * | 8/1990 | Poole et al. ..................... 149/46 |
| 5,646,292 | A | 7/1997 | Nakagawa et al. |
| 5,661,192 | A | 8/1997 | Giraud |
| 2006/0029836 | A1 | 2/2006 | Hairston et al. |

FOREIGN PATENT DOCUMENTS

| DE | 1 569 535 | 7/1969 |
| DE | 2 063 586 | 7/1971 |
| EP | 0 037 188 | 10/1981 |
| EP | 1 000 916 | 5/2000 |
| FR | 2 739 389 | 4/1997 |
| FR | 2 899 227 | 10/2007 |
| WO | 99/46009 | 9/1999 |
| WO | 2004/080921 | 9/2004 |
| WO | 2005/090456 | 9/2005 |

* cited by examiner

*Primary Examiner* — Timothy Vanoy
(74) *Attorney, Agent, or Firm* — Hamre, Schumann, Mueller & Larson, P.C.

(57) ABSTRACT

Compositions to generate nitrogenous gas, with a low decomposition temperature, and processes for the generation of nitrogenous gas comprising the decomposition of such compositions, are provided. The compositions include azodicarbonamide, a nitrogenous reducing charge, and at least one additive. The azodicarbonamide and the nitrogenous reducing charge represent at least 90% of their weight. The nitrogenous reducing charge includes at least one compound from a first family of reducing components chosen from tetrazole, tetrazole derivatives and their salts, salts of bitetrazole and of its derivatives, 5,5'-azobitetrazole salts, polyvinyltetrazoles and their mixtures; and/or at least one compound from a second family of reducing components chosen from dicyandiamide, 1-hydrobenzotriazole, silicon nitride, nitroguanidine, guanidine nitrate and their mixtures. a nitrogenous reducing charge and azodicarbonamide.

17 Claims, No Drawings

COMPOSITION FOR GENERATING NITROGENOUS GAS AND INCLUDING AZODICARBONAMIDE, AND METHOD FOR GENERATING NITROGEN GAS BY DECOMPOSITION OF SAID COMPOSITION

A subject matter of the present invention is gas-generating compositions comprising azodicarbonamide and processes for the generation of nitrogenous gas using said compositions.

Compositions which generate a large amount of nitrogen are desired for numerous civil and military applications, and in particular for the pressurization of tanks or the blowing of structures.

The desired compositions should meet the following specifications:
have a high gas yield,
produce predominantly gases which are neutral with regard to the application, in particular which are devoid of acid, mainly nitrogen,
have a low combustion or decomposition temperature of less than 1500 K,
operate (in combustion or decomposition) at a low pressure, of less than 10 MPa, with kinetics which are slow but which can be adjusted according to the applications,
be compatible with a simple and relatively inexpensive industrial use.

Various types of compositions at least partially meeting these specifications have already formed the subject of studies. Compositions based on sodium azide ($NaN_3$) or on calcium azide ($Ca(N_3)_2$) are recommended in the literature (U.S. Pat. No. 4,547,235; U.S. Pat. No. 4,092,190) for the generation of nitrogen. The main disadvantage of compositions of this type is that they include azide-based compounds which are highly toxic to man and to the environment, which makes their development complex.

Consequently, improvements have been sought. In particular, nitrogenous molecules of tetrazole type have been selected for generating nitrogen. U.S. Pat. No. 4,601,344 thus describes compositions based on glycidyl azide polymer (PGA) and on nitrogen-rich solid additives, such as guanylaminotetrazole nitrate. However, these compositions have high combustion temperatures, of the order of 2800 K.

Many documents of the prior art (in particular the patent documents DE 15 69 535, WO 2005/090456, U.S. Pat. No. 5,646,292, U.S. Pat. No. 3,873,477, U.S. Pat. No. 4,142,029, US 2006/029836 and EP 37 188) describe the use of chemical compounds, such as azo and hydrazo compounds, tetrazole derivatives, melamine, urea, dicyandiamide, azodicarbonamide and others, as blowing agents for producing thermoplastic foams.

Many other documents of the prior art (in particular the patent documents WO 2004/080921, WO 99/46009, U.S. Pat. No. 3,912,561, DE 20 63 586, FR 2 899 227 and EP 1 000 916) describe pyrotechnic compositions which include an oxidizing charge and which exhibit combustion temperatures of greater than 1500 K.

The prior art does not describe compositions of the type of those of the invention (see below), optimized with reference to the above specifications (very particularly with reference to the first three points of said specifications).

According to its first subject matter, the present invention relates to compositions which generate nitrogenous gas ((solid) compositions capable of generating nitrogenous gas by decomposition) and which are devoid of oxidizing charge. Characteristically, said compositions of the invention comprise mainly a specific nitrogenous reducing charge and the azodicarbonamide compound, in given proportions.

The compositions of the invention comprise:
from 20 to 80% by weight of azodicarbonamide,
from 20 to 80% by weight of a nitrogenous reducing charge,
from 0 to less than 10% by weight of at least one additive;
said azodicarbonamide and said nitrogenous reducing charge representing at least 90% of their weight and said nitrogenous reducing charge comprising:
at least one compound from a first family of reducing components chosen from tetrazole, tetrazole derivatives and their salts, salts of bitetrazole and of its derivatives, 5,5'-azobitetrazole salts, polyvinyltetrazoles and their mixtures;
and/or
at least one compound from a second family of reducing components chosen from dicyandiamide, 1-hydrobenzotriazole, silicon nitride, nitroguanidine, guanidine nitrate and their mixtures.

The person skilled in the art knows the compound azodicarbonamide, commonly used as expanding compound in the plastics industry (see more particularly the teachings of FR 2 739 389 and U.S. Pat. No. 4,328,320, and the product Azobul® from Arkema). Azodicarbonamide corresponds to the following empirical chemical formula $C_2H_4N_4O_2$, and to the expanded chemical formula below:

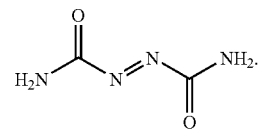

(Azodicarbonamide)

It is recorded under CAS No. 123-77-3.

Expanding products, of which azodicarbonamide forms part, have the main property of rapidly decomposing at a precise temperature, generally at approximately 500 K, while generating nontoxic gases.

It is to the credit of the inventors to have demonstrated the advantage of azodicarbonamide in combination with a specific nitrogenous reducing charge for generating nitrogenous gas.

The compositions of the invention jointly include said nitrogenous charge and said azodicarbonamide. They mainly include said nitrogenous charge and said azodicarbonamide; that is to say that said charge and said compound represent at least 90% by weight of said compositions. Advantageously, they represent at least 93% by weight of said compositions.

The compositions of the invention can be entirely composed to 100% (by weight) of said nitrogenous charge and said azodicarbonamide. They are composed to at least 90% by weight (advantageously to at least 93% by weight) of said charge and said compound (see above) and they are capable of additionally including a low content (less than 10% by weight, advantageously less than 7% by weight) of additive(s).

The nitrogenous reducing charge comprises:
at least one compound from a first family of reducing components chosen from tetrazole, tetrazole derivatives and their salts, salts of bitetrazole and of its derivatives, 5,5'-azobitetrazole salts, polyvinyltetrazoles (products known as binders) and their mixtures;
and/or
at least one compound from a second family of reducing components chosen from dicyandiamide (DCDA), 1-hydrobenzotriazole (HOBT), silicon nitride, nitroguanidine, guanidine nitrate and their mixtures.

It thus comprises:
- at least one compound from said first family; or
- at least one compound from said second family; or
- at least one compound from said first family and at least one compound from said second family.

As regards said first family, the derivatives of the compounds involved are mainly said compounds which are substituted, in particular by an amino group, and the salts involved are mainly the alkali metal salts (sodium or potassium salts, advantageously), the alkaline earth metal salts (advantageously calcium salts) and the ammonium salts, such as:
- the potassium salt of 5-aminotetrazole,
- the sodium salt of 5-aminotetrazole,
- the calcium salt of 5-aminotetrazole,
- the ammonium salt of bitetrazole,
- the sodium salt of bitetrazole,
- the ammonium salt of bitetrazolamine,
- the sodium salt of 5,5'-azobitetrazole,
- the calcium salt of 5,5'-azobitetrazole.

A person skilled in the art knows the compounds from said first and second families which are capable of being present within the nitrogenous reducing charge of the gas-generating compositions of the invention. It is to the credit of the inventors to have demonstrated the advantage of their involvement in combination with azodicarbonamide in a gas-generating context.

It is entirely possible for the nitrogenous reducing charge of the compositions of the invention to include nitrogenous compounds other than those of the two families identified above, in addition to the latter compounds. According to an advantageous alternative form, it includes, as nitrogenous compounds, only such compounds.

Advantageously, said nitrogenous reducing charge is composed to at least 90% by weight (indeed even to 100% by weight) of at least one compound from the first family identified above. In the context of this advantageous alternative form, when it is not composed to 100% by weight of at least one such compound (but thus to at least 90% by weight), the remainder to 100% can be mainly, indeed even can be completely, composed of at least one additive and/or of at least one nitrogenous compound belonging neither to the first nor to the second of said families. However, said remainder to 100% is preferably at least partially made up of at least one compound from the second family.

In the context of said advantageous alternative form, it is thus possible to have several scenarios, in particular:
- 100% by weight of the nitrogenous reducing charge composed of at least one compound from the first family;
- 100% by weight of said nitrogenous reducing charge composed of at least 90% by weight (but less than 100% by weight) of at least one compound from the first family+the remainder to 100% composed of at least one compound from the second family;
- 100% by weight of said nitrogenous reducing charge composed of at least 90% by weight (but less than 100% by weight) of at least one compound from the first family+the remainder to 100% composed of at least one compound from the second family+of at least one additive and/or other compound; advantageously of at least one compound from said second family+of at least one additive.

Generally, in the context of advantageous alternative forms, the expression "at least one compound" employed above is interpreted as "a compound".

The compositions of the invention are thus capable of including a low content of additive(s). According to an alternative form, the compositions of the invention, in addition to the nitrogenous reducing charge and the azodicarbonamide, specifically comprise, at a content of less than 10% by weight, advantageously of less than 7% by weight, at least one additive. Said at least one additive can be chosen in particular from compounds capable of lowering the decomposition temperature of the composition (i.e., agents for decomposing the azodicarbonamide). Said at least one such compound is, for example, chosen from zinc derivatives and urea. It is advantageously chosen from zinc stearate and/or zinc oxide. Furthermore, it is not ruled out for an additive of binder type (manufacturing aid) to be present in the compositions of the invention.

The compositions of the invention advantageously comprise:
- from 25 to 55% by weight of azodicarbonamide,
- from 45 to 75% by weight of a nitrogenous reducing charge (as specified above),
- from 0 to less than 7% by weight of at least one additive.

According to a particularly preferred alternative form, to be considered independently of or in combination with the above advantageous alternative form, the nitrogenous reducing charge of the compositions of the invention comprises, advantageously consists of, diammonium bitetrazole. The diammonium bitetrazole+azodicarbonamide combination is particularly effective with reference to the specifications set out in the introduction to the present text.

The natures of the constituents of the compositions of the invention and the levels of involvement of each of said constituents have been specified above. The form of said compositions will now be dealt with. They are, as has already been understood by a person skilled in the art, capable of existing in different forms.

The compositions of the invention can in particular be provided in the pulverulent form (mixtures comprising the nitrogenous reducing charge and the azodicarbonamide, in the form of powders) or in the form of solid compounds: compacted materials which exhibit a given geometric shape. Such solid compounds generally consist of grains (granules), pellets or blocks. Said grains, pellets or blocks have any shape, for example spherical, ovoid or cylindrical. The grains generally have a weight of a few milligrams, the pellets a weight from a few tenths of a gram to a few grams and the blocks a weight from a few tens of grams to a few hundred grams. Said blocks can be mono- or multiperforated monolithic blocks.

The processes for producing such solid compounds starting from powders are processes known to a person skilled in the art.

Such solid compounds can thus be obtained starting from powders by granulation and pelletizing, by granulation and compression, or by simple compression.

A person skilled in the art is not unaware of the advantage which there generally is in granulating the pulverulent mixtures. The powders are granulated in order to provide the composition with flow and homogeneity without obviously affecting the possibility or the ease thereof of being compressed. Two conventional granulation methods exist: dry granulation and wet granulation. These two granulation methods are suitable in the context of the invention. A person skilled in the art generally chooses one or other of these two methods according to the geometry of the composition necessary for the operation of the gas generator and according to the specific application targeted.

The granules of the invention comprising the specific nitrogenous reducing charge and the azodicarbonamide are interesting per se.

They can also be used to prepare larger objects.

To this end, they are molded by pelletizing (in order to obtain pellets with dimensions suited to the desired needs (whether this is expressed in three-dimensional or volume terms), the granules are introduced into a pelletizer, and the like) or by compression (in order to obtain, as a rule, compounds with larger dimensions ($\phi$=50 mm, t=50 mm, for example), requiring longer times of maintenance under pressure than those observed with the pelletizers, granules are introduced into a mold of fixed and appropriate geometry and they are compressed in said mold. It is thus possible to obtain mono- or multiperforated monolithic blocks, according thus to the desired compound dimension).

Shaping by simple compression of a mixture of the powders (comprising the specific nitrogenous reducing charge+ the azodicarbonamide) is also possible in order to obtain small or large objects. It is not ruled out to add, to said mixture of powders, a binder in order to obtain a compact object, which can be compressed, extruded or cast to the desired geometry.

The compositions of the invention are effective with reference to the specifications set out in the introduction to the present text. They have in particular a high gas yield (50 mol/kg) with decomposition temperatures below 1500 K. The compositions of the invention predominantly generate nitrogen (50% to more than 70% by weight).

According to its second subject matter, the present invention relates to processes for the generation of nitrogenous gas by decomposition of at least one (solid) composition. Characteristically, said at least one composition is a composition (comprising the specific nitrogenous reducing charge+the azodicarbonamide) according to the first subject matter of the invention, as described above.

The decomposition involved can be initiated by any process known to a person skilled in the art. The energy necessary for its initiation can be contributed by any conventional means. The energy necessary for the initiation of said decomposition is advantageously contributed by the combustion of a pyrotechnic charge. Said pyrotechnic charge is advantageously a charge, the combustion of which generates (combustion) products at best coming within the specifications set out in the introduction to the present text. Said pyrotechnic charge is very advantageously based on a mixture of guanidine nitrate and basic copper nitrate. A person skilled in the art knows how best to adjust, at a minimal level, the weight of said pyrotechnic charge (generally a weight of less than one tenth of the total weight of the charge: charge (=composition) of the invention+pyrotechnic charge), in particular according to the gas-generating device used and the weight of composition of the invention involved, in order to obtain good decomposition, indeed even optimized decomposition, of said composition.

The processes of the invention can be carried out in different contexts and in particular for the blowing of structures, the pressurization of chambers, the extinguishing of fires or inerting (inerting operations).

It is now intended to illustrate, without implied limitation, the invention at present claimed.

A. Thermodynamic Calculations

Thermodynamic calculations show the advantage of the gas-generating compositions according to the invention.

The results of such calculations for six compositions of the invention (examples 1 to 6) appear in the tables below.

The compositions of examples 1 to 3 below are compositions of the invention comprising a mixture between, on the one hand, azodicarbonamide and, on the other hand, a reducing charge composed of a component from the first family of reducing components (examples 1 and 2) or of a component from the second family of reducing components (example 3).

The compositions of examples 4 and 5 below are compositions of the invention comprising a mixture between, on the one hand, azodicarbonamide and, on the other hand, a reducing charge composed of a component from said first family and of a component from said second family.

The composition of example 6 below is a composition of the invention comprising a mixture between, on the one hand, azodicarbonamide and, on the other hand, a reducing charge composed of two components from said first family.

The compositions by weight of said compositions are given in the first part of the tables below. The results of thermodynamic calculations are given in the second part of said tables. There have more specifically been calculated:

the oxygen balance of the composition (OB),
the decomposition temperature of the latter (DT),
the gas yield,
the level of particles (Part. Level),
the level of CO produced,
the percentage by weight of nitrogen ($N_2$) produced.

The following abbreviations are used in the tables of the examples:

AZODICA: azodicarbonamide
DABTZ: diammonium bitetrazole
PVT: polyvinyltetrazole
5AT: 5-a minotetrazole
GN: guanidine nitrate
HOBT: 1H-benzotriazole
GUDN: guanylurea dinitramide
DCDA: dicyandiamide.

The results of the examples show the advantage of the compositions of the invention. Stress is very particularly laid on the gas yields combined with a very negative oxygen balance value and low combustion temperatures, as well as a high percentage of nitrogen.

EXAMPLE 1

| Composition in % by weight | | OB | DT | Gas Yield | Part. Level | CO | $N_2$ |
|---|---|---|---|---|---|---|---|
| AZODICA | DABTZ | (%) | (K) | (mol/kg) | (% by weight) | (ppm) | (% by weight) |
| 30 | 70 | −69 | 1225 | 51 | 10 | 1236 | 71 |
| 40 | 60 | −67 | 1200 | 50 | 9 | 1678 | 68 |
| 50 | 50 | −65 | 1179 | 50 | 8 | 2128 | 65 |
| 60 | 40 | −63 | 1159 | 50 | 7 | 2584 | 61 |
| 70 | 30 | −61 | 1141 | 49 | 6 | 3042 | 58 |

EXAMPLE 2

| Composition in % by weight | | OB | DT | Gas Yield | Part. Level | CO | $N_2$ |
|---|---|---|---|---|---|---|---|
| AZODICA | 5AT | (%) | (K) | (mol/kg) | (% by weight) | (ppm) | (% by weight) |
| 30 | 70 | −63 | 1420 | 47 | 10 | 1156 | 72 |
| 40 | 60 | −62 | 1346 | 47 | 9 | 1610 | 69 |
| 50 | 50 | −60 | 1288 | 47 | 8 | 2077 | 65 |
| 60 | 40 | −59 | 1241 | 48 | 7 | 2553 | 62 |
| 70 | 30 | −58 | 1200 | 48 | 6 | 3034 | 58 |

EXAMPLE 3

| Composition in % by weight | | OB | DT | Gas Yield | Part. Level | CO | $N_2$ |
|---|---|---|---|---|---|---|---|
| AZODICA | DCDA | (%) | (K) | (mol/kg) | (% by weight) | (ppm) | (% by weight) |
| 30 | 70 | −96 | 1018 | 47 | 20 | 1369 | 61 |
| 40 | 60 | −91 | 1030 | 47 | 18 | 1821 | 59 |
| 50 | 50 | −85 | 1042 | 47 | 15 | 2267 | 57 |
| 60 | 40 | −79 | 1053 | 48 | 13 | 2706 | 56 |
| 70 | 30 | −73 | 1063 | 48 | 11 | 3137 | 54 |

EXAMPLE 4

| Composition in % by weight | | | OB | DT | Gas Yield | Part. Level | CO | $N_2$ |
|---|---|---|---|---|---|---|---|---|
| AZODICA | DABTZ | HOBT | (%) | (K) | (mol/kg) | (% by weight) | (ppm) | (% by weight) |
| 25 | 65 | 10 | −78 | 1377 | 49 | 14 | 1114 | 68 |
| 30 | 60 | 10 | −77 | 1374 | 49 | 13 | 1307 | 66 |
| 30 | 55 | 15 | −81 | 1402 | 48 | 15 | 1402 | 64 |
| 35 | 60 | 5 | −72 | 1345 | 50 | 11 | 1425 | 67 |
| 35 | 55 | 10 | −76 | 1372 | 49 | 13 | 1501 | 65 |
| 20 | 70 | 10 | −79 | 1380 | 49 | 14 | 922 | 70 |

EXAMPLE 5

| AZODICA | DABTZ | $Si_3N_4$ | OB (%) | DT (K) | Gas Yield (mol/kg) | Part. Level (% by weight) | CO (ppm) | $N_2$ (% by weight) |
|---|---|---|---|---|---|---|---|---|
| 20 | 70 | 10 | −70 | 1414 | 44 | 25 | 560 | 69 |
| 25 | 65 | 10 | −69 | 1432 | 43 | 26 | 754 | 69 |
| 30 | 60 | 10 | −68 | 1416 | 43 | 26 | 965 | 67 |
| 30 | 55 | 15 | −68 | 1464 | 40 | 32 | 869 | 64 |
| 35 | 60 | 5 | −67 | 1287 | 47 | 17 | 966 | 68 |
| 35 | 55 | 10 | −67 | 1389 | 43 | 25 | 1191 | 66 |

EXAMPLE 6

| AZODICA | DABTZ | PVT | OB (%) | DT (K) | Gas Yield (mol/kg) | Part. Level (% by weight) | CO (ppm) | $N_2$ (% by weight) |
|---|---|---|---|---|---|---|---|---|
| 20 | 70 | 10 | −74 | 1285 | 48 | 18 | 814 | 71 |
| 25 | 70 | 5 | −71 | 1253 | 49 | 14 | 1026 | 71 |

-continued

| AZODICA | DABTZ | PVT | OB (%) | DT (K) | Gas Yield (mol/kg) | Part. Level (% by weight) | CO (ppm) | N₂ (% by weight) |
|---|---|---|---|---|---|---|---|---|
| 30 | 60 | 10 | −72 | 1251 | 47 | 17 | 1253 | 68 |
| 30 | 65 | 5 | −70 | 1238 | 49 | 13 | 1245 | 70 |

The preferred compositions of the invention are those comprising a mixture of azodicarbonamide and DABTZ (see the above text and examples 1 (above) and 7 (below)), to which mixture the additives zinc oxide and zinc stearate are advantageously added in a small amount. Such a particularly preferred composition is presented in example 7 below.

EXAMPLE 7

| AZODICA | DABTZ | ZnO | Zn stearate | OB (%) | DT (K) | Yield (mol/kg) | Part. Level (%) | CO (ppm) | N₂ (% by weight) |
|---|---|---|---|---|---|---|---|---|---|
| 25 | 70 | 2.5 | 2.5 | −72 | 1213 | 50 | 11 | 1160 | 69 |

B. Gas Generation

Decomposition tests were carried out starting from pellets of the invention with a diameter of 20 mm and a thickness of 6 to 16 mm.

Said pellets were prepared, starting from mixtures of appropriate powders (exhibiting the compositions by weight of the above examples) by wet granulation and then pelletizing.

For good decomposition, these pellets are fragmented into smaller elements, with a diameter of 2.5 mm, for example.

It is recommended to combine with the charge of the invention, placed in a gas-generating device, a "pilot" charge, with a lower weight (typically with a weight of less than one tenth of the total weight of the charge), composed of a pyrotechnic composition of the prior art with a high combustion temperature. The choice is carefully made of a pyrotechnic composition, the nature of the combustion products of which approaches the specifications set out, for example a composition comprising a mixture of guanidine nitrate and basic copper nitrate.

Characteristics of the operation of a composition of the invention comprising 30% of azodicarbonamide and 70% of DABTZ (combined with a pilot pyrotechnic charge based on a mixture of guanidine nitrate and basic copper nitrate) were obtained in a gas-generating device for an operation at low combustion pressures of between 0.1 MPa (1 bar) and 0.2 MPa (2 bar). Complete decomposition of the charge of the composition of the invention is obtained. In practice, the gas yields (~18 mol/kg) are lower than those predicted by the calculations but remain high in comparison with those of the compositions of the state of the art for equivalent operating conditions. The percentage of nitrogen ($N_2$) generated in the gaseous decomposition products is high, greater than 75%.

The invention claimed is:

1. A composition which is capable of generating nitrogenous gas by decomposition, comprising:
   from 20 to 80% by weight of azodicarbonamide,
   from 20 to 80% by weight of a nitrogenous reducing charge,
   from 0 to less than 10% by weight of at least one additive;
   said azodicarbonamide and said nitrogenous reducing charge representing at least 90% by weight of the composition, and the composition is devoid of oxidizing charge, and
   said nitrogenous reducing charge comprising at least one selected from the group consisting of:
   at least one compound from a first family of reducing components chosen from tetrazole, tetrazole derivatives and their salts, salts of bitetrazole and of its derivatives, 5,5'-azobitetrazole salts, polyvinyltetrazoles and their mixtures; and
   at least one compound from a second family of reducing components chosen from dicyandiamide, 1-hydrobenzotriazole, silicon nitride, nitroguanidine, guanidine nitrate and their mixtures.

2. The composition as claimed in claim 1, comprising:
   from 25 to 55% by weight of azodicarbonamide,
   from 45 to 75% by weight of a nitrogenous reducing charge,
   from 0 to less than 7% by weight of at least one additive.

3. The composition as claimed in claim 1, wherein said azodicarbonamide and said nitrogenous reducing charge represent at least 93% by weight of said composition.

4. The composition as claimed in claim 1, wherein said nitrogenous reducing charge is composed of at least 90% by weight of at least one compound from said first family.

5. The composition as claimed in claim 4, wherein the remainder of the nitrogenous reducing charge is at least partially made up of at least one compound from said second family.

6. The composition as claimed in claim 1, wherein said at least one additive is at least one chosen from zinc derivatives and urea.

7. The composition as claimed in claim 1, wherein the nitrogenous reducing charge comprises diammonium bitetrazole.

8. The composition as claimed in claim 1, provided in a pulverulent form or in a form of solid compounds of grain, pellet or block type.

9. The composition as claimed in claim 1, provided in a form of mono- or multiperforated monolithic blocks.

10. A process for the generation of nitrogenous gas by decomposition of at least one composition, wherein said at least one composition is a composition as claimed in claim 1.

11. The process as claimed in claim 10, wherein the energy necessary for the initiation of said decomposition of said at least one composition is contributed by the combustion of a pyrotechnic charge.

12. The process as claimed in claim 11, wherein said pyrotechnic charge is based on a mixture of guanidine nitrate and basic copper nitrate.

13. The process as claimed in claim 10, wherein the process is carried out for blowing of structures, pressurization of chambers, and extinguishing of fires or inerting.

14. The composition as claimed in claim 6, wherein the additive comprises of at least one of zinc stearate and zinc oxide.

15. The composition as claimed in claim 7, wherein the nitrogenous reducing charge consists of diammonium bitetrazole.

16. The composition as claimed in claim 1, consisting essentially of said azodicarbonamide, said at least nitrogenous reducing charge and from 0 to less than 10% of said at least one additive, which if present is chosen from zinc derivatives and urea.

17. The composition as claimed in claim 2, consisting essentially of from 25 to 55% by weight of azodicarbonamide, from 45 to 75% by weight of a nitrogenous reducing charge, and from 0 to less than 7% by weight of at least one additive.

\* \* \* \* \*